United States Patent
Kashiwagi

(10) Patent No.: US 8,335,478 B2
(45) Date of Patent: Dec. 18, 2012

(54) COMMUNICATION DEVICE

(75) Inventor: Hiroki Kashiwagi, Osaka (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 504 days.

(21) Appl. No.: 12/671,877

(22) PCT Filed: Jul. 30, 2008

(86) PCT No.: PCT/JP2008/063634
§ 371 (c)(1),
(2), (4) Date: Feb. 2, 2010

(87) PCT Pub. No.: WO2009/020018
PCT Pub. Date: Feb. 12, 2009

(65) Prior Publication Data
US 2010/0233972 A1    Sep. 16, 2010

(30) Foreign Application Priority Data
Aug. 3, 2007 (JP) .................. 2007-203147

(51) Int. Cl.
*H04B 1/44* (2006.01)

(52) U.S. Cl. ........... 455/78; 455/83; 455/553.1; 455/77; 455/82; 370/488; 370/343; 333/133; 333/193; 330/101; 330/103; 330/126; 330/134

(58) Field of Classification Search .................. 455/455, 455/553.1, 78, 83, 82; 330/101, 103, 126, 330/134; 370/277, 480, 488, 343; 333/133, 333/193
See application file for complete search history.

(56) References Cited

U.S. PATENT DOCUMENTS

| | | | | |
|---|---|---|---|---|
| 5,815,804 A | * | 9/1998 | Newell et al. | 455/78 |
| 2002/0049075 A1 | * | 4/2002 | Takagi | 455/553 |
| 2003/0058891 A1 | * | 3/2003 | Nobbe et al. | 370/488 |
| 2003/0076195 A1 | * | 4/2003 | Ishizaki et al. | 333/133 |

FOREIGN PATENT DOCUMENTS

| | | |
|---|---|---|
| EP | 1 093 222 A1 | 4/2001 |
| JP | 2000-295055 A | 10/2000 |
| JP | 2002-135157 A | 5/2002 |
| JP | 2002-141826 A | 5/2002 |
| JP | 2003-179463 A | 6/2003 |
| JP | 2005-64778 A | 3/2005 |
| JP | 2005-507206 A | 3/2005 |

* cited by examiner

*Primary Examiner* — April G Gonzales
(74) *Attorney, Agent, or Firm* — Birch, Stewart, Kolasch & Birch, LLP

(57) ABSTRACT

Provided are a first filter 63a and a second filter 63b each having a pass band in the range of a frequency band that is obtained by, for example, substantially bisecting a frequency band of f1 to f4. In that case, the regions of the first filter 63a and the second filter 63b partially overlap with each other with the center frequency f5 interposed therebetween. In practice, even if the division is not bisection, a configuration is adopted in which a frequency region of the wider band (the first frequency band 61a) closer to a second frequency band 61b side is covered by the second filter 63b. Accordingly, it is possible to suppress the influence of load fluctuation in a multiband-compatible radio communication device.

14 Claims, 14 Drawing Sheets

FIG. 2
(a)
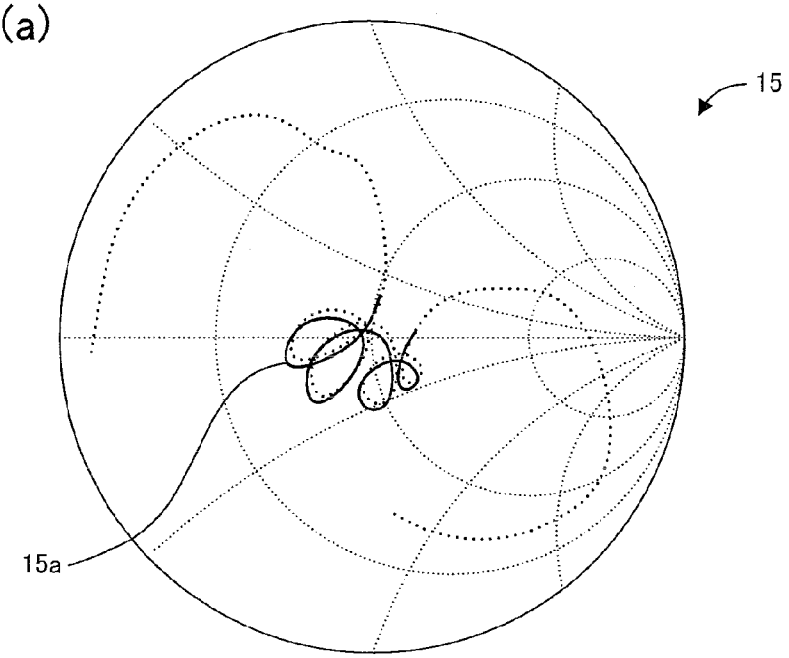
Image view of impedance of wide-band filter
(b)
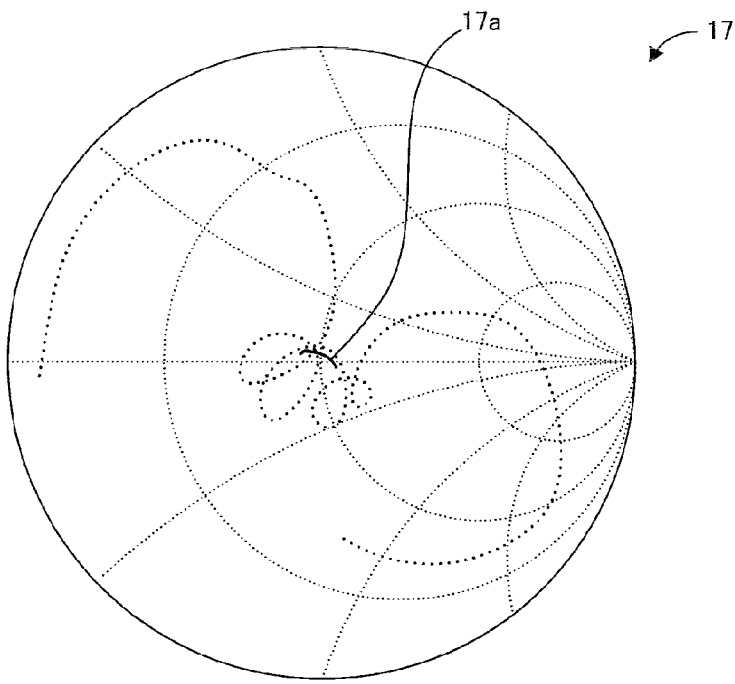
Image view of impedance of narrow-band filter FIG. 3
(a)
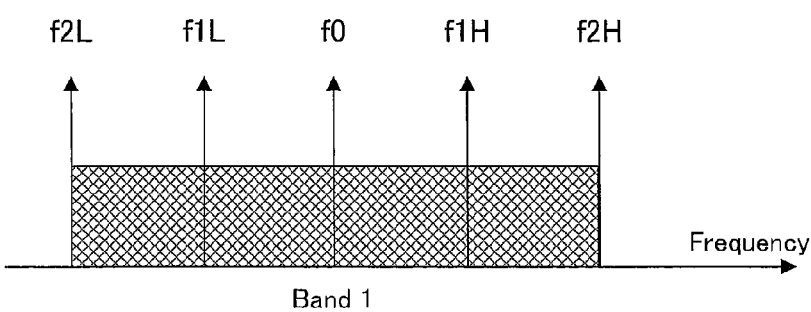
(b)
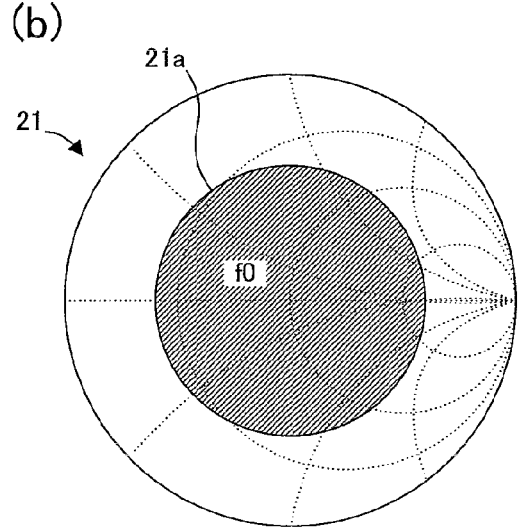
(c)
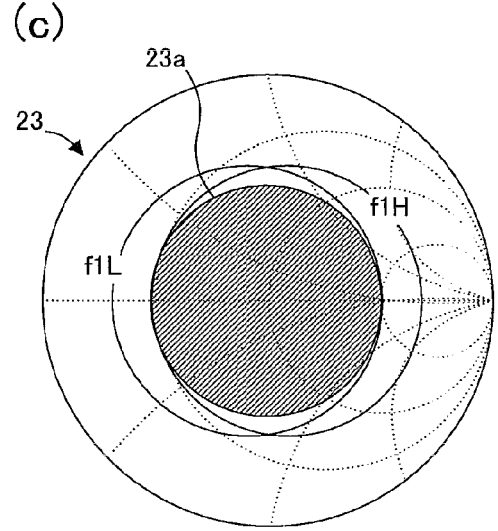
(d)
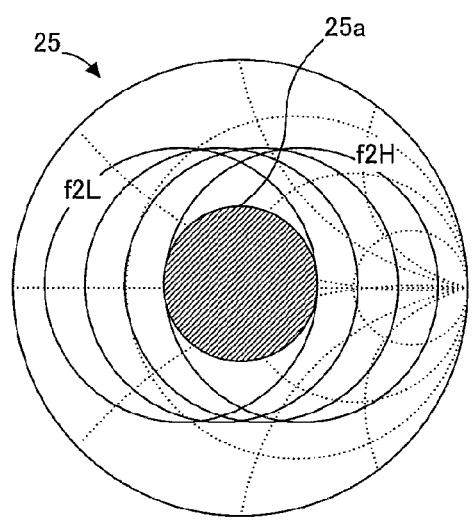

FIG. 12
(a)
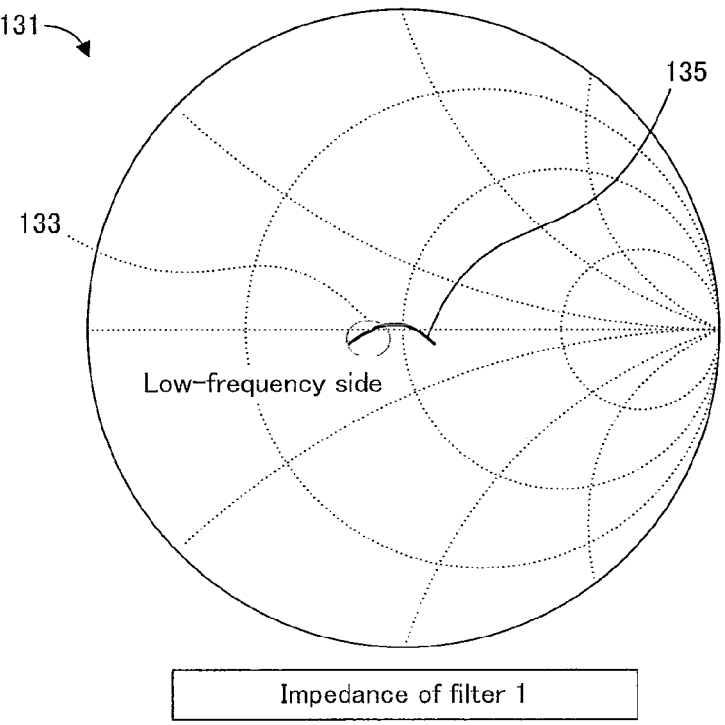
Impedance of filter 1
(b)
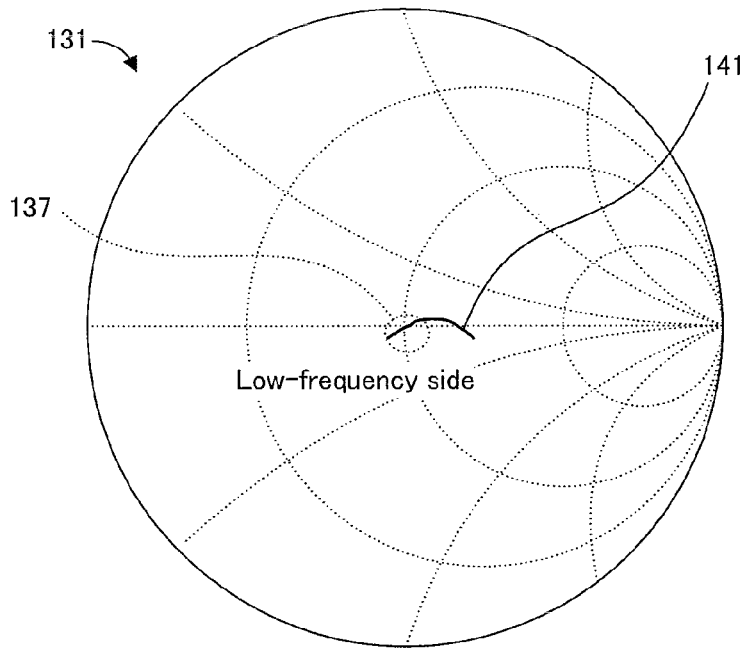
Adjusted impedance of filter 1
(Low-frequency side is adjusted to be closer to 50 Ω)

COMMUNICATION DEVICE

TECHNICAL FIELD

The present invention relates to a communication device and, in particular, to a filter construction technique for realizing an amplifier suited to multiband-compatible radio communication devices.

BACKGROUND ART

With the increased use of mobile terminal devices such as mobile phones, mobile terminal devices that can be used across borders, namely, multiband radio communication terminal devices have also been actively developed to enable global roaming. Although there has been a trend toward global standardization of frequency allocation, it is being put into practice only gradually. When a frequency band adopted by each nation is seen, some frequency band is allocated as a transmission band in some areas whereas it is allocated as a reception band in other areas. Further, there may arise, in response to the trend toward standardization, a need to accommodate a plurality of bands in the transition phase. Meanwhile, although a band allocated within a nation is relatively wide, there usually exist a plurality of telecommunications carriers that share the band within the nation. Thus, in practice, some percentage of the bandwidth of the allocated band is assigned to the individual telecommunications carrier as an available frequency bandwidth. Accordingly, terminals have only to be operative over only the frequency band assigned to the individual telecommunications carrier. Meanwhile, when roaming overseas, roaming terminals are demanded to be operative over as wide a band of frequencies as possible because such terminals are desired to be operative in as many areas as possible.

There is another context that a power amplifier (hereinafter referred to as "PA") have properties that its current, distortion characteristics, gains, and the like can greatly vary in response to load fluctuation. An antenna of a mobile terminal device is used while being carried by a user. Thus, the impedance of the antenna can easily change under the influence of the human body and the like.

In order to solve such a problem, an isolator is typically provided at the output stage of the PA so as to isolate the impedance fluctuation and thus to stabilize the load of the PA. Nowadays, however, there have been an increasing number of mobile terminal devices without isolators with a view to reduce the cost and size of the devices, and such devices have been proposed to cope with the aforementioned degradation of properties (see Patent Document 1).

According to the technique described in Patent Document 1 below, a variable load is connected to a signal line between an output terminal of a power amplifier and an antenna element of a mobile phone. Upon fluctuation of the load, the position of the operating load point after the fluctuation on the Smith chart is estimated by detecting a change in operating current or gain of the power amplifier, and then a control circuit performs switch-control of the variable load in a direction to relieve the load fluctuation.

Patent Document 1: JP Patent Publication (Kokai) No. 2000-295055 A

DISCLOSURE OF THE INVENTION

Problems to be Solved by the Invention

However, in such a case, to what extent the load impedance of the PA output would vary upon fluctuation of the antenna load becomes an important factor on design. From such a perspective, the impedance of a filter on the transmission output stage (this is also true for a duplexer that is an integrated transmitting/receiving filter) is desirably as close to 50Ω as possible. However, the wider the pass band of the filter, the more difficult it is to realize the filter, with the result that that the reduction of insertion loss is prioritized, leaving little margin for optimizing the impedance. Further, since a wide-band filter has frequency characteristics and has distributed impedance, it has been difficult to optimally adjust the impedance over the entire range.

It is an object of the present invention to suppress the influence of load fluctuation of a PA in a multiband-compatible mobile communication terminal device.

Means for Solving the Problems

According to one aspect of the present invention, there is provided a multiband-compatible radio communication device capable of using a first frequency band and a second frequency band, the device comprising a first filter and a second filter, wherein each of a first pass band, which is a pass band of the first filter, and a second pass band, which is a pass band of the second filter, includes at least a part of the first frequency band or the second frequency band, and a difference between a bandwidth of the first pass band and a bandwidth of the second pass band is smaller than a difference between a bandwidth of the first frequency band and a bandwidth of the second frequency band.

There is also provided a multiband-compatible radio communication device capable of using a plurality of frequency bands including a first frequency band and a second frequency band, the device comprising a first filter with a first pass band and a second filter with a second pass band, wherein each of the first pass band and the second pass band includes at least a part of the first frequency band or the second frequency band, and the number of the filters is larger than the number of the frequency bands.

Accordingly, it is possible to cover, for example, the first frequency band, which is a wide band, with the first filter and the second filter. When only a part of the pass band of the first frequency band is used, that is, when a narrow-band filter is used instead of a wide-band filter, it is possible to design the impedance of the filter at the pass band to be closer to 50Ω while suppressing the insertion loss small.

Preferably, the device also comprises a first power amplifier configured to amplify a radio-frequency signal, an output signal of the first power amplifier being filtered by the first filter; a second power amplifier configured to amplify a radio-frequency signal, an output signal of the second power amplifier being filtered by the second filter; a switch provided at the other ends of the first filter and the second filter, the switch being configured to switch between the first filter and the second filter; and an antenna configured to handle a signal from the switch.

For example, even when the terminal is to be used in different areas, it is possible to realize the use of the terminal over a wide band of frequencies and suppress load fluctuation of the PA by automatically or manually switching the switch with the terminal in accordance with communication frequency channels.

Preferably, the device also comprises a first power amplifier provided at one ends of the first filter and the second filter, the first power amplifier being configured to amplify a radio-frequency signal; an isolator provided between the one ends and the power amplifier; a first switch provided between the isolator and the one ends, the first switch being configured to switch between the first filter and the second filter; a second switch provided at the other ends of the first filter and the second filter, the second switch being configured to switch between the first filter and the second filter; and an antenna configured to handle a signal from the second switch.

A frequency at which a maximum isolation effect of the isolator is obtained is preferably set close to a boundary between the first pass band and the second pass band or overlapping frequencies thereof. Preferably, an output impedance of the first filter, on a frequency side further from the pass band of the second filter than a frequency side closer to the pass band of the second filter, is relatively close to 50Ω, and an output impedance of the second filter, on a side of its pass band further from the pass band of the first filter than a side closer to the pass band of the first filter, is also relatively close to 50Ω. An input of a filter refers to a terminal that receives a target signal, whereas an output of a filter refers to a terminal from which the signal is output. Preferably, an input impedance of the first filter, on a frequency side of its pass band further from the pass band of the second filter than a frequency side closer to the pass band of the second filter, is relatively close to 50Ω, and an input impedance of the second filter, on a side of its pass band further from the pass band of the first filter than a side closer to the pass band of the first filter, is also relatively close to 50Ω. Further, a matching circuit configured to adjust the impedance of the filter may be provided for at least one of the first filter and the second filter.

As described above, by adjusting the impedance at the bands corresponding to the opposite edges of the entire bands including the first frequency band and the second frequency band to be closer to 50Ω, it becomes possible to suppress the influence of load fluctuation of the PA even at a band for which the isolation effect of the isolator is difficult to be obtained.

By adjusting the impedance of the low-frequency side of the low-frequency-side filter as well as the impedance of the radio-frequency side of the radio-frequency-side filter to be closer to 50Ω, it becomes possible to suppress load fluctuation relatively easily.

It should be noted that the device typically includes a transmission device and a reception device.

It should also be noted that the aforementioned multiband-compatible radio communication device can be used for mobile terminal devices. In addition, the present invention can also be a filter used for the aforementioned multiband-compatible radio communication device.

Advantageous Effects of the Invention

According to the present invention, the influence of load fluctuation in a multiband-compatible radio communication device can be suppressed. Further, a configuration without an isolator is also possible. In that case, reductions in cost and size of the device are possible.

BRIEF DESCRIPTION OF THE DRAWINGS

FIG. 2 are image plot views of the impedance of filters.

FIG. 3 each shows the relationship between an impedance region of a PA load, within which the adjacent channel leakage power meets the standard value, and the frequency bandwidth shown on a Smith chart.

FIG. 12 are Smith charts showing the adjusted impedance characteristics of the low-frequency side of a filter in the configuration shown in FIG. 10.

Figure 1:
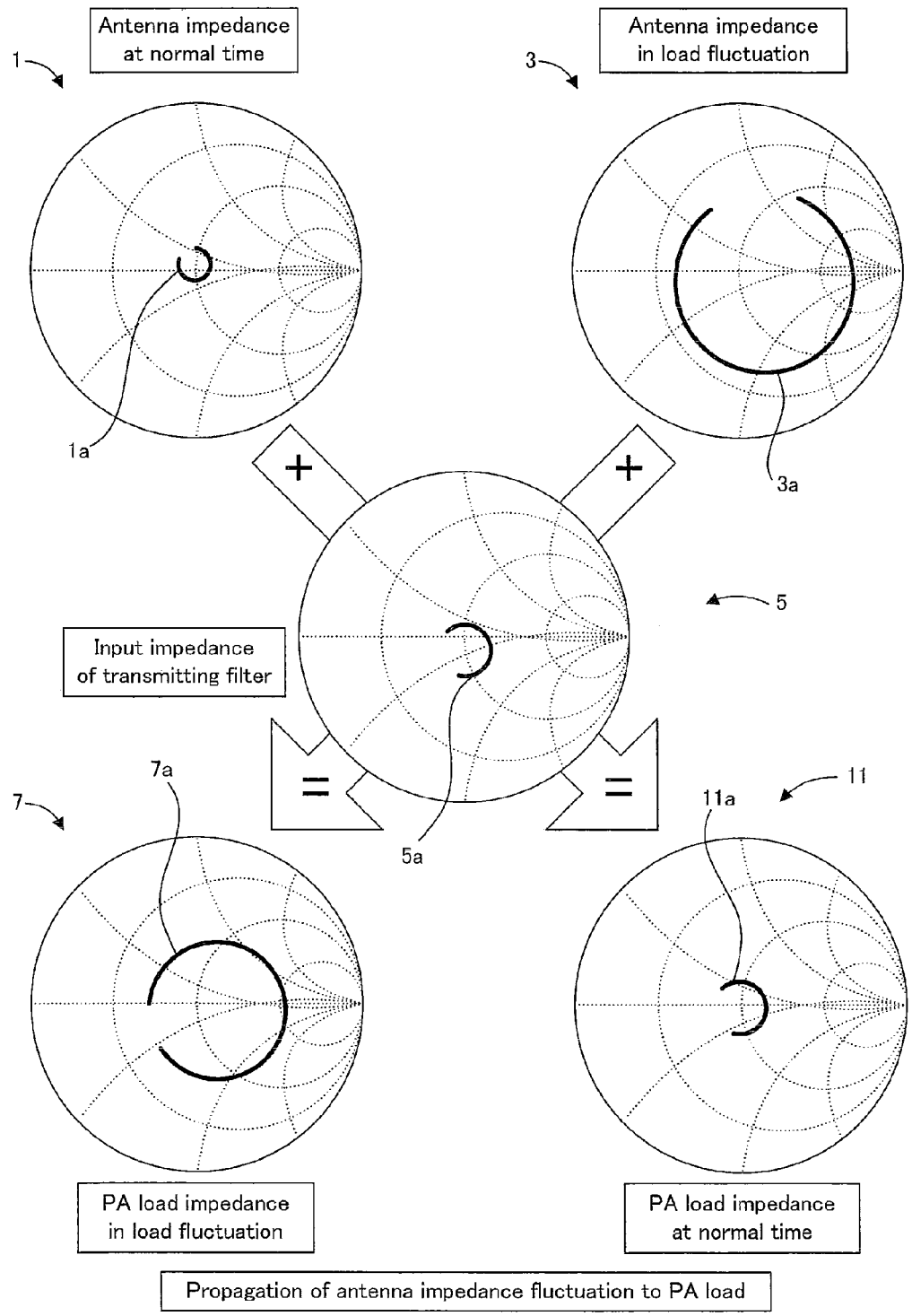
FIG. 1 shows a view in which the impedance fluctuation of an antenna propagates to the PA load.

DESCRIPTION OF SYMBOLS 1, 3, 5, 7, 11, 15, 17, 21, 23, 25, 131 Smith chart
1a, 3a, 5a, 7a, 11a, 15a, 17a, 21a, 23a, 25a, 135, 141 impedance
31, 101 communication circuit
33, 103 antenna
35, 105 first filter
37, 107 second filter
41, 77, 113 first radio-power amplifier (HPA)
43, 81, 127 second radio-power amplifier
45, 115 radio-frequency circuit portion
46 base band processor
47 controller (CPU)
49 memory (storage portion)
57, 117, 119 selector switch (SPDTSW)
61 assigned frequency band
63, 65, 67, 67a, 69 filter pass band
71 first filter (duplexer)
72 second filter (duplexer)
111 isolator
121, 123, 125 matching circuit
75, 83 LNA (low-noise amplifier)

133 impedance 1 of unadjusted filter
137 impedance 2 of adjusted filter
201 first chassis
202 second chassis
204 control portion
205 display portion
251 first system
252 second system
A multiband-compatible mobile terminal
B1-B3 terminals that can be used only within the first system
C1-C3 terminals that can be used only within the second system

BEST MODES FOR CARRYING OUT THE INVENTION

The "pass-band width" as used in this specification refers to the bandwidth of frequencies that are actually used for communication, and includes the bandwidth of a filter that is physically wider than such a bandwidth. That is, since discussed here is the impedance at frequencies used for communication, impedance at frequencies outside the used frequencies is not a concern.

Hereinafter, a multiband-compatible radio communication device in accordance with each embodiment of the present invention will be described, taking a mobile communication device as an example, with reference to the accompanying drawings.

A multiband-compatible radio communication device in accordance with the present invention is characterized in that the bandwidth of a first filter is narrowed and the narrowed bandwidth is covered by a second filter different from the first filter.

Further, when a PA is used over a wide band of frequencies, a region of the load impedance in which good distortion characteristics are obtained varies depending on frequencies. Thus, the range of impedance in which distortions satisfy the standards, which is common to the entire frequency band, becomes narrow. Since the load impedance fluctuation of the PA needs to be within such a range, design complexity could be increased. Thus, if the frequency band of the first filter is narrowed as described above, it becomes only necessary to adjust the impedance at the range of frequencies corresponding to the narrowed bandwidth, resulting in a simpler circuit design.

Further, even when an isolator is used in the case in which the PA is used over a wide band of frequencies, the range in which a sufficient isolation effect is obtained is narrow. Thus, a phenomenon similar to that described above is generated in the range in which the isolation effect is not obtained. Thus, by positioning the center frequency of the isolator to be in the vicinity of the center of the wide band and equally dividing a filter as in the present invention, for example, it becomes possible to individually adjust the impedance of each filter at frequencies closer to the opposite edges of the band (Embodiment 2).

When PAs are connected to a wide-band filter and a narrow-band filter, respectively, without the use of isolators, the PA for the wide-band filter needs to be designed with a sufficient margin of distortions, which could increase the cost of the PA. Thus, equally dividing a filter allows the use of devices with about equal designs and processes for the two PAs, with the need of only fine adjustment. This can reduce the cost than the case in which two PAs with different specifications are used.

FIG. 2 each shows a plot image obtained by joining the impedance of a filter at each frequency. In FIG. 2, the solid line represents the pass band and the dotted line represents the stop band FIG. 2A is a Smith chart showing an image of the impedance of a wide-band filter and FIG. 2B shows a case in which the use of only a part of the band of the filter of FIG. 2A is considered, that is, a case in which only the solid-line portion is used. It can be seen that although the stop band deviates from the position of 50Ω (the center of the Smith chart) to a great extent while the pass band is located in the vicinity of 50Ω, the positions thereof vary depending on frequencies. Smith charts are complex planes representing reflection coefficients. Using these can determine the complex impedance of a transmission line. The horizontal axis represents the real part of complex reflection coefficient, and the vertical axis represents the imaginary part. On each circle, the real (resistance) components of the impedance are constant, whereas on curved lines that are curved in up-and-down directions (in practice, arcs), the imaginary (reactance) components of impedance are constant. The center of the chart corresponds to the matched load and transmission line, which means that there are no reflected waves and no-loss transmission is achieved. The periphery of the chart corresponds to 100% reflection, which means that all signals have returned to the input. In radio communications, Smith charts are often handled with their centers set at 50Ω as the standards. Thus, in the following description, the centers of all charts shall be regarded as 50Ω.

As can be understood from FIG. 2A, using only a part of the pass band of the frequency filter used in FIG. 2A allows the use of only a range very close to 50Ω as shown in FIG. 2B. In this example, description has been made of the fact, for the sake of simplicity, that using only a part of the pass band of a single filter makes it easier to gather the impedance of the filter toward 50Ω. However, the impedance design flexibility can also be increased by designing the pass band of the filter to be narrow, thereby integrating the impedance.

That is, FIG. 2B shows the fact that narrowing the pass band of a filter will allow the impedance thereof to be designed close to 50Ω while maintaining the insertion loss small, thereby facilitating the optimization. In contrast, when a wide pass band is required, suppression of the insertion loss is prioritized. Thus, the impedance could deviate from 50Ω as in the initial plot image (FIG. 2A). Typically, the mainstream SAW band-pass filter is said to have a maximum pass-band width of, in terms of fractional bandwidth, up to about 4%.

Next, what influence the aforementioned impedance has will be described with reference to the drawings. The upper two Smith charts of FIG. 1 respectively show images of the impedance of an antenna located in free space and the impedance of antenna that fluctuates to a great extent in case in which, for example, a human body, metal, or the like is present in the surrounding and it comes closer to or apart from the device. The characteristic 1a of the Smith chart indicated by numeral 1 of FIG. 1 shows a view of the antenna impedance at normal time. Ideally, the antenna is located in free space where no obstacles exist on the periphery of the terminal. When the antenna impedance is connected to the impedance of a transmitting filter (or a duplexer) (see the characteristic 5a of a Smith chart indicated by numeral 5), it is seen that the load of the PA at normal time is stable and hardly changes because both the impedance 1a in free space and the impedance 5a of the transmitting filter are close to 50Ω (see the characteristic 11a of a Smith chart indicated by numeral 11).

Meanwhile, when the antenna impedance greatly deviates from 50Ω (see the characteristic 3a of a Smith chart 3), the PA load in load fluctuation will also change in a similar manner (see the characteristic 7a of a Smith chart 7). In such a case, if the impedance of the transmitting filter is not concentrated at 50Ω, the deviation spreads elliptically, and the deviation from 50Ω can be either smaller or larger than the case in which the impedance is concentrated at 50Ω, depending on frequencies. From the design perspective, it is necessary to take the possible large deviation into consideration to allow for the worst case. Although only a single impedance characteristic of the transmitting filter is shown for the sake of clarity, the impedance differs at the input and output of the filter. Thus, the degree of concentration of impedance at both the input and output is important.

Next, the PA load characteristics will be examined. Distortions, current consumption, gain, and the like will greatly change by the impedance of the load. With regard to the distortions, if adjacent channel leakage power, in particular, is outside the standard value, it could interfere with other communications, and thus can cause a system failure. An increase in current consumption can lead to a heat increase of the PA, which in turn can cause a shutdown of the terminal due to overload, or in the worse case, can break the PA. A significant drop in gain can lead to a possibility that the nominal output level cannot be ensured, whereby communications may become more easily interrupted. For such reasons, manufactures of PAs provide load maps in which distortions, current, gain, and the like are shown on Smith charts in a manner similar to contour lines. Next, drawings that show only distortions will be illustrated for the sake of clarity. FIG. 3A exemplary shows a frequency band used by a given system. As shown in FIG. 3A, the three following frequency bands (bands) used are considered: f0, f1L-f1H, and f2L-f2H. A Smith chart 21 shown in FIG. 3B shows an impedance region 21a within which the adjacent channel leakage power meets the standard value, when the frequency band used is f0. Although the region should originally be of a more complex shape, it is shown here in a circular shape for the sake of clarity. Thus, a relatively wide region is obtained as shown. A plurality of channels are assigned as communication channels. That is, a bandwidth is provided. The impedance region can differ depending on frequencies within the bandwidth. When the band is widened from a single frequency to f1L-f1H as shown in FIG. 3C, a region 23a that is narrower than the region 21a results as shown in a Smith chart 23. When the band is further widened to f2L-f2H as shown in FIG. 3D, for example, the resulting region becomes further narrower than the region 23a and only a region 25a can satisfy the standards as shown in a Smith chart 25. As described above, a common area that can satisfy the standards becomes narrower with an increasing frequency band. Although the ranges of impedance that can satisfy the standards are shown in circles of the same size in the description here, the size of the circles should actually become smaller at frequencies closer to the edges of the band, because widening the frequency band will also place limitations on the widening of the band of the PA and thus could deteriorate the characteristics at the edges of the band. When the foregoing is considered, a common impedance range that can satisfy the standards over the entire band of frequencies can be even narrower.

Hereinafter, a mobile communication device in accordance with the first embodiment of the present invention will be described with reference to the drawings.

The communication technique of the present embodiment uses two different frequency bands that are in proximity to each other. Such a communication technique can be effectively used when a single communication terminal device communicates over the two frequency bands. Described below is a case in which the widths of the two frequency bands greatly differ, in particular.

Figure 4:
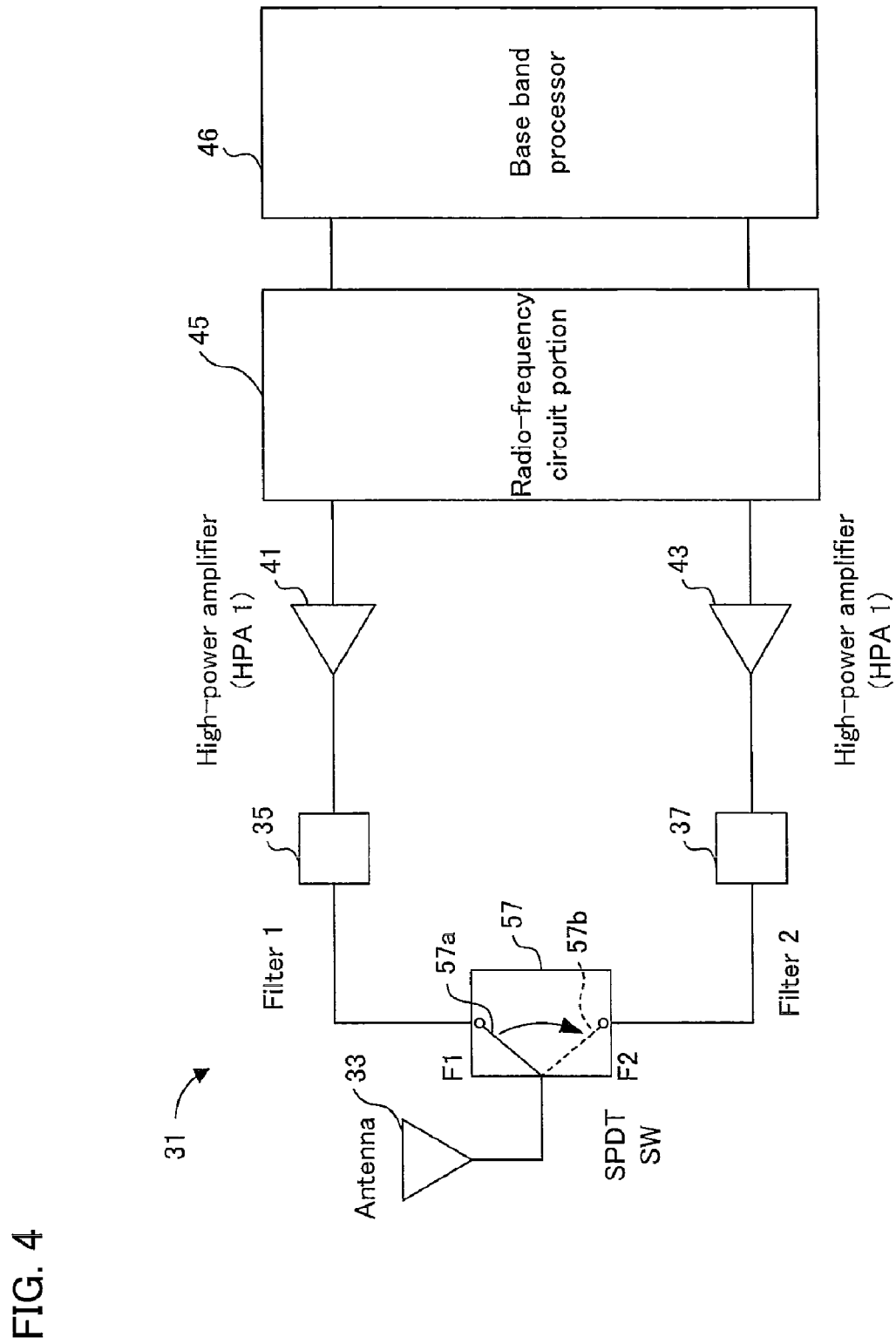
FIG. 4 is a functional block diagram showing an exemplary configuration of a mobile communication terminal device in accordance with the first embodiment of the present invention.

FIG. 4 is a functional block diagram showing an exemplary configuration of the main part of a communication circuit used for a communication terminal device in accordance with the present embodiment. A communication circuit 31 shown in FIG. 4 includes an antenna 33, a first filter 35, a second filter 37, a first high-power amplifier (HPA) 41 provided on the side of the first filter 35, a second high-power amplifier (HPA) 43 provided on the side of the second filter 37, and a selector switch (SPDTSW) 57 that switches the connection of the antenna 33 to the first filter 35 or the second filter 37 and includes a connection line 57a connected to the first filter 35 side F1 and a connection line 57b connected to the second filter 37 side F2. Each of the first high-power amplifier (HPA) 41 and the second high-power amplifier (HPA) 43 is connected to a radio-frequency circuit portion 45. The radio-frequency circuit portion 45 includes a variable amplifier and a frequency converter that convert the frequencies and levels of signals from a base band processor 46 to appropriate frequencies and levels and supplies the signals to the first high-power amplifier (HPA) 41 and the second high-power amplifier (HPA) 43; a signal generator that generates signals for use in frequency conversion; and the like. As the terminal, a controller (CPU) that controls the aforementioned circuits, memory for storing programs, and a user interface such as a display portion and a key input portion are provided, though not shown.

Figure 5:
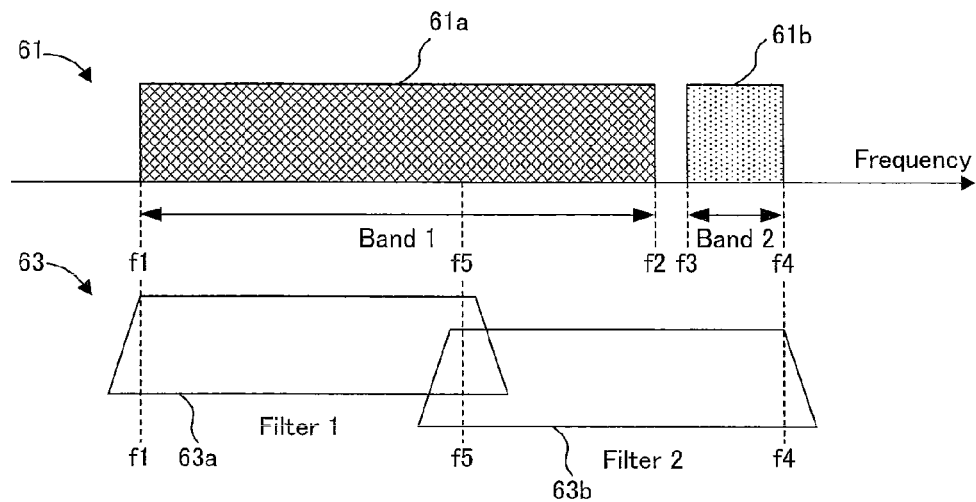
FIG. 5 is a diagram showing the first example of setting filters in the circuit configuration shown in FIG. 4.

FIG. 5 exemplarily shows the relationship between the frequency bands used by the communication circuit and the pass bands of the filters in accordance with the present embodiment.

The "band" as used herein refers to a group of frequencies to which the same standard is assigned. This can be understood when the following case of international roaming is considered, for example: an area in which a band 1 is operated differs from an area in which a band 2 is operated. The band 2 with a narrower bandwidth is used in an area in which the relevant terminal is sold, and the band 1 with a wider bandwidth is used in other areas. Further, even within a single nation, if the nation were to change the frequency allocation for standardization on a worldwide basis, a case may be arise in which the old band and the new band would coexist during the transition phase.

In order to accommodate a plurality of bands, a filter with a pass band that agrees with the bandwidth of each system is usually provided. In the present embodiment, a first filter 63a and a second filter 63b are provided, each having a pass band in the range of a frequency band that is obtained by, for example, substantially bisecting a frequency band of f1 to f4. In that case, the regions of the first filter 63a and the second filter 63b may partially overlap with each other with the center frequency f5 interposed therebetween. In practice, even if the division is not bisection, a configuration is preferably adopted in which a frequency region of the wider band (the first frequency band 61a) closer to a second frequency band 61b side is covered by the second filter 63b. In this manner, it is very probable that the bandwidths f2-f1 and f4-f3 greatly differ when international roaming is considered. In Japan, a plurality of telecommunications carriers share different bands for providing services. Thus, each telecommunications carrier will never use its competitors' bands, with the result that only a fraction of the allocated bands could have been used so far. However, from the perspective of enabling roaming over as wide an area as possible across the world, it is desirable to cover as wide a roaming band as possible.

Thus, the present invention proposes, not forming a filter corresponding to the frequency band of each operated band, but setting, as in the communication technique in accordance with the present embodiment, the pass band of a first filter such that the wider-band side becomes narrow and covering a band uncovered with the first filter as well as the narrower band side using a second filter. Preferably, the two bandwidths are substantially equal.

Accordingly, it is possible to avoid a circumstance that the PA load on the wider-band side is difficult to be kept in a good condition close to 50Ω as mentioned previously. Further, when the bandwidths are unbalanced, it is necessary to design the PA on the wider-band side with a sufficient margin such that the linearity of even higher output power can be maintained in order to stabilize the characteristics across a wide band. In such a case, not only does the cost and size of the PA increase, but also the electric current at the actually used output power could increase, whereby the current consumption of the PA on the wider-band side becomes disadvantageously dominant over the duration of a call. However, when the two bandwidths are set substantially equal, the frequency bands can be made closer to each other, whereby it becomes possible to use substantially the same or slightly adjusted PAs for the two PAs. This is advantageous in that the procurement cost is reduced and the availability is increased.

Figure 6:
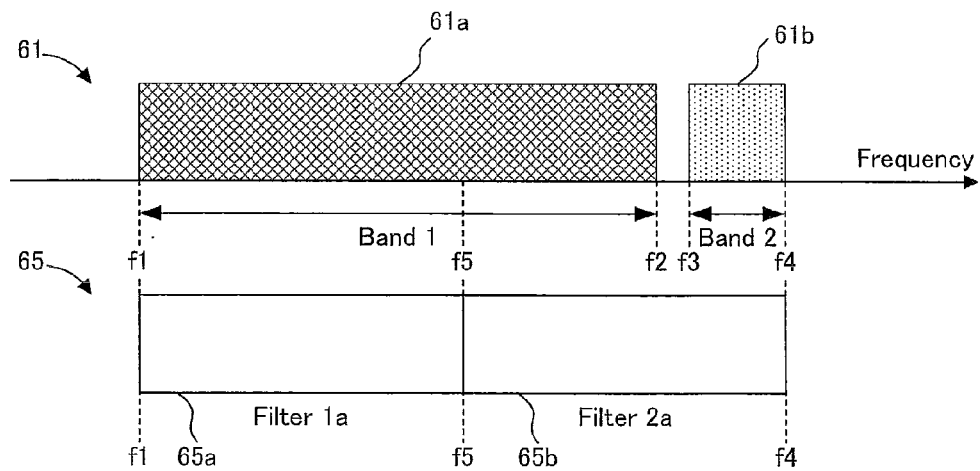
FIG. 6 is a diagram showing the second example (the first variation) of setting filters in the circuit configuration shown in FIG. 4.
Figure 7:
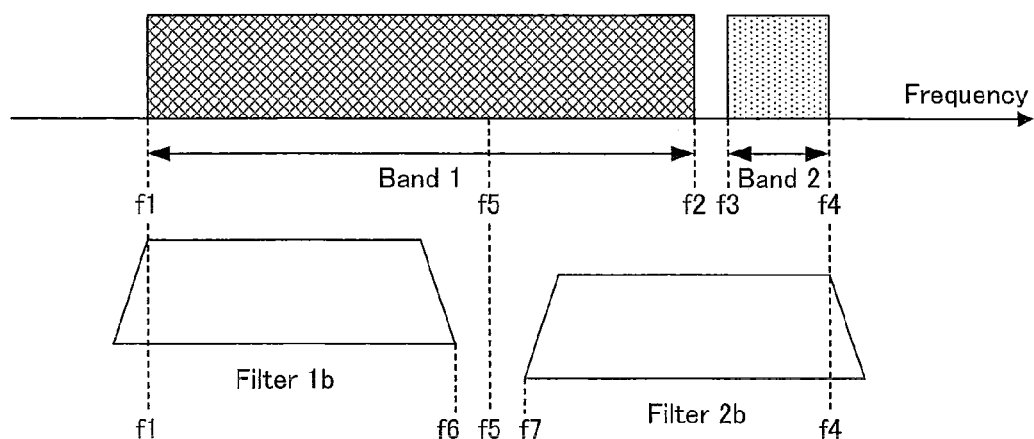
FIG. 7 is a diagram showing the third example (the second variation) of setting filters in the circuit configuration shown in FIG. 4.

Next, communication techniques in accordance with the first and second variations of the present embodiment will be described with reference to the drawings. FIGS. 6 and 7 show examples that are based on the circuit configuration shown in FIG. 4 and in which the setting of the filters shown in FIG. 5 is changed. In FIG. 6, the edges of the pass bands of a first filter 65a and a second filter 65b overlap with each other in the vicinity of the intermediate frequency f5. In FIG. 7, the edges of the pass bands of the first filter 65a and the second filter 65b are away from each other in the vicinity of the intermediate frequency f5 (a radio-frequency-side edge f6 of the first filter and a low-frequency-side edge f7 of the second filter are away from each other). In any case, it is possible to obtain advantageous effects substantially equal to those obtained with the filter configuration shown in FIG. 5.

Figure 8:
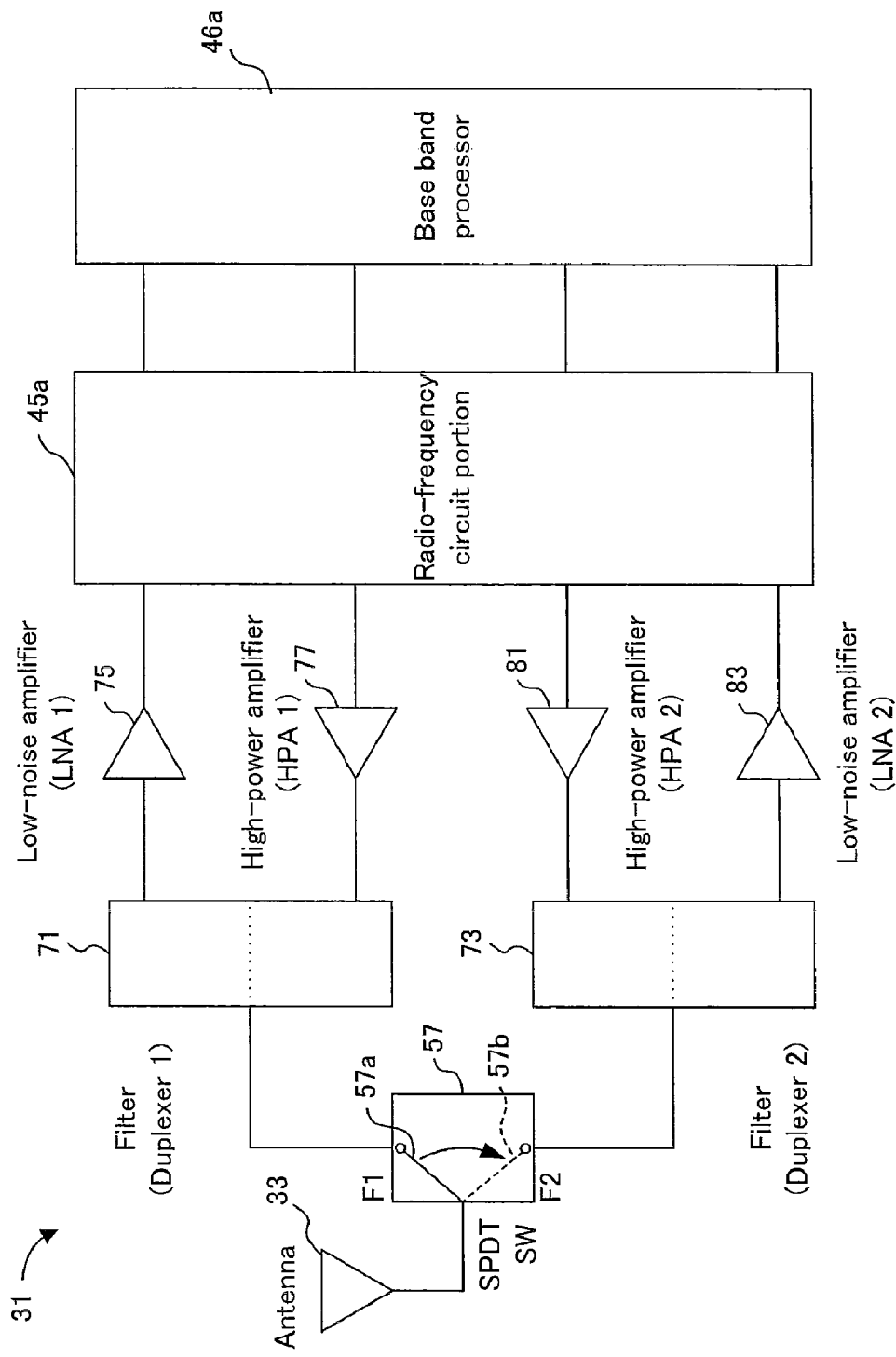
FIG. 8 is a functional block diagram showing an exemplary configuration of a mobile communication terminal device in accordance with the third variation of the present embodiment.

Described next with reference to the drawings is a mobile communication device in accordance with the third variation of the present embodiment. As shown in FIG. 8, a mobile communication device 31 in accordance with the present embodiment includes an antenna 33; a first duplexer 71 which is a first filter; a second duplexer 73 which is a second filter; a transmission high-power amplifier 77 and a reception low-noise amplifier 75 provided on the first duplexer 71 side; a transmission high-power amplifier 81 and a reception low-noise amplifier 83 provided on the second duplexer 73 side; a radio-frequency circuit portion 45a connected to the amplifiers; and a base band processor 46a. The radio-frequency circuit portion 45a includes a variable amplifier, a frequency converter, a signal generator, and the like. A CPU, a display portion, memory, and a key input portion are also the same as those described with reference to FIG. 4. Even if transmission frequency bands are in proximity to each other, it is not necessarily the case that reception bands are also in proximity to each other because the transmission/reception intervals differ depending on systems. In that case, it is also possible to use a triplexer configuration in which one transmitting filter and two receiving filters are used.

Figure 9:
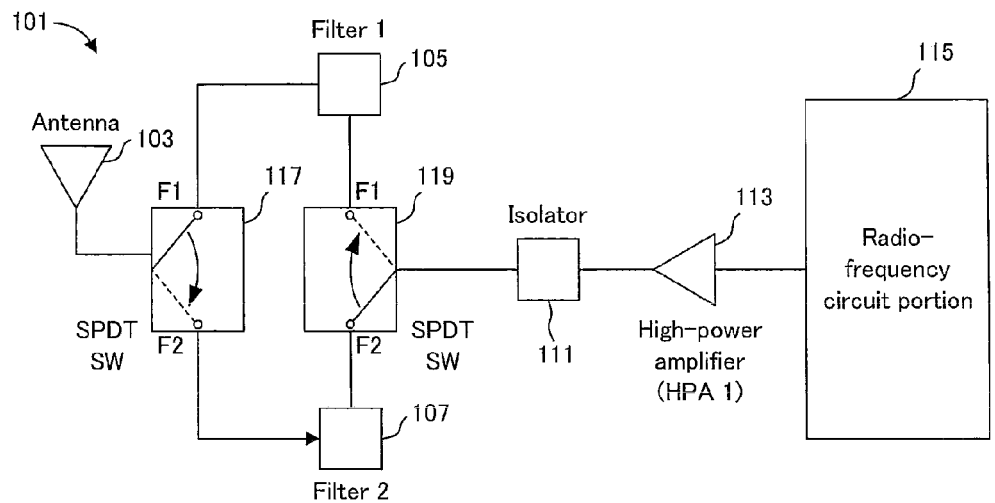
FIG. 9 is a functional block diagram showing an exemplary configuration of a mobile communication terminal device in accordance with the second embodiment of the present invention.

Next, a mobile communication device in accordance with the second embodiment of the present invention will be described with reference to the drawings. FIG. 9 is a functional block diagram showing an exemplary configuration of a mobile communication device in accordance with the present embodiment. The mobile communication device 101 shown in FIG. 9 includes an antenna 103, a first filter 105, a second filter 107, an isolator 111, a first high-power amplifier 113, and a radio-frequency circuit portion 115. A first switch 117 is provided between the antenna 103 and the filters 105 and 107, while a second switch 119 is provided between the filters 105 and 107 and the isolator 111.

Figure 10:
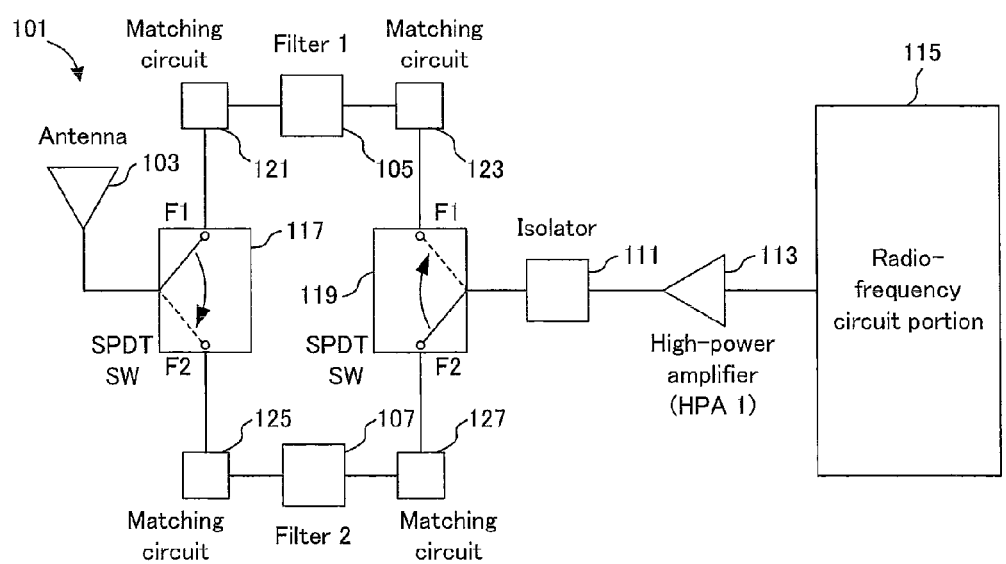
FIG. 10 is a functional block diagram showing an exemplary configuration of a mobile communication terminal device in accordance with the first variation of FIG. 9.

FIG. 10 shows a variation of the mobile communication device shown in FIG. 9. The device shown in FIG. 10 includes, in addition to the device shown in FIG. 9, a matching circuit 121 between the filter 105 and the first switch 117, a matching circuit 125 between the second filter 107 and the first switch 117, a matching circuit 123 between the first filter 105 and the second switch 119, and a matching circuit 127 between the second filter 107 and the second switch 119.

Figure 11:
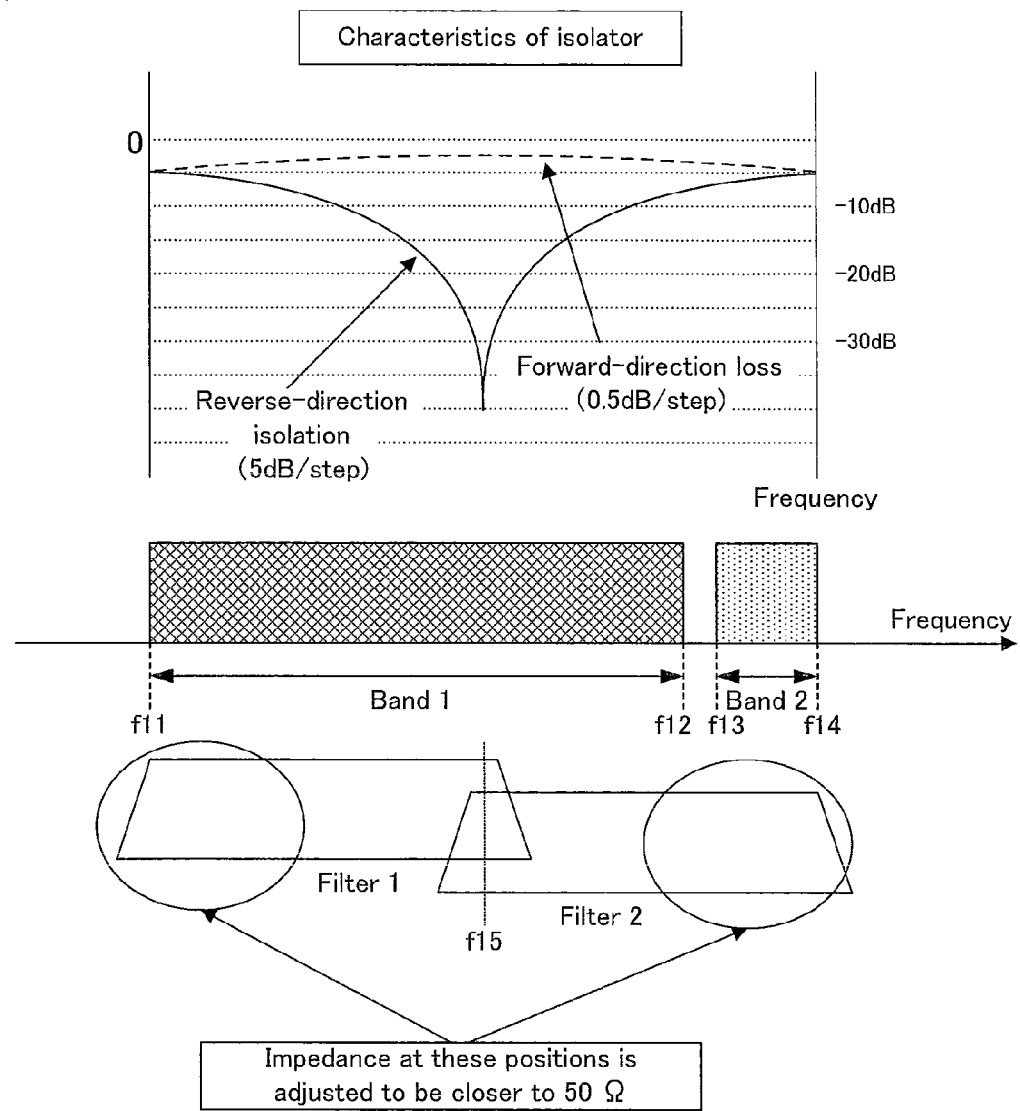
FIG. 11 is a diagram showing an example of setting filters in the circuit configurations shown in FIGS. 9 and 10 with the characteristics of the isolator shown together.

FIG. 11 exemplarily shows the relationship among the characteristics of the isolator, the frequency bands used, and the pass bands of the filters of the mobile communication device in accordance with the present embodiment. The relationship between the frequency bands used and the pass bands of the filters is the same as that of the first embodiment shown in FIG. 5. That is, the first filter 105 is adapted to cover the low-frequency side, namely, f11 to f15, of the frequency band f11 to f12 of the first filter 105, whereas the second filter 107 corresponding to the second frequency band of f13 to f14 is adapted to cover the band of f15 to f12.

As described above, using the isolator 111 for the two frequency bands can realize a configuration with only a single HPA 113.

It should be noted that using the isolator 111 against the antenna impedance fluctuation can make the load fluctuation of the HPA less visible. Thus, band widening can be realized with the single HPA 113. However, if the isolator 111 whose size is reduced for use in mobile communication devices is used, the effect of isolation that is obtained as the difference between the forward-direction loss and the reverse-direction loss would be limited to that within a relatively narrow band, and can be small at the opposite edges of the frequency band used. Thus, although the load in the vicinity of the center frequency can be stable, the effect of reducing the load fluctuation with the isolator can be smaller at frequencies closer to the edges of the frequency band. Further, since the entire bands are covered using only the single HPA 113, severe constraints are imposed on the design of the HPA 113 in terms of its distortion characteristics. Thus, in the present embodiment, the wider-band side of the first filter 105 is also narrowed and the narrower-band side of the second filter 107 is also widened so that the management of impedance becomes necessary only at a single end of each filter and thus that the range of load fluctuation can be, minimized. For example, the impedance in a region in the vicinity of f11 of the first filter 105 is set closer to 50Ω, and the impedance in a region in the vicinity of f14 of the second filter 107 is set closer to 50Ω. That is, setting the impedance closer to 50Ω only at a portion of the band where the isolation effect is small can be effective enough. That is, the communication circuit in accordance with the present embodiment is characterized in that the output (the antenna 103 side) impedance of the first filter 105, on a side of its pass band further from the pass band of the second filter 107 than a side closer to the pass band of the second filter 107, is closer to 50Ω, and similarly, the output impedance of the second filter 107, on a side of its pass band further from the pass band of the first filter 105 than a side closer to the pass band of the first filter 105, is closer to 50Ω, and is also characterized in that the output (the antenna side) impedance of the first filter 105, on a side of its pass band further from the pass band of the second filter 107 than a side closer to the pass band of the second filter 107, is closer to 50Ω, and similarly, the input impedance of the second filter 107, on a side of its pass band further from the pass band of the first filter 105 than a side closer to the pass band of the first filter 105, is closer to 50Ω. It should be noted that regarding the input (PA side) impedance, the influence of the antenna impedance fluctuation tends to be smaller due to the presence of a filter loss of about 1 to 3 dB.

That is, whereas the impedance over the entire pass bands of the filters are set closer to 50Ω in the first embodiment, in the second embodiment, the impedance at a single end, in which the isolation effect is small, of each pass band is preferably set closer to 50Ω. The impedance of a filter is usually adjusted mainly in the design phase of the filter. However, it is also possible to finely adjust the impedance of a filter after it is mounted on a circuit board in manufacturing a mobile communication terminal. In that case, a matching circuit with inductors, capacitors, and the like can be disposed on the stage preceding or following the filter (see FIG. 10). An example in which impedance matching is performed with a matching circuit in the configuration of FIG. 10 will be described with reference to Smith charts. A Smith chart 131 shown in FIG. 12A shows impedance 135 of the first filter 105. A low frequency-side region is located within a circle indicated by numeral 133. As seen from FIG. 12A, it is assumed that the low-frequency-side region 133 diverges a little from the point of 50Ω at the center of the Smith chart toward a radio-frequency side. Thus, using the matching circuit shown in FIG. 10 can adjust the impedance on the low-frequency side (when it is assumed that the isolation effect obtained at the low-frequency side is smaller than that obtained at the radio-frequency side) to be closer to 50Ω.

For example, although the input impedance and the output impedance of a filter differ, if the input impedance is to be adjusted, it can be adjusted by adjusting the matching circuit on the input end. There are cases in which the impedance at only the input side needs to be adjusted. However, there are also cases in which the output matching adjustment on the opposite side is also necessary because adjusting the impedance on a single side will have no small effect on the impedance on the other side.

As shown in FIG. 12B, the impedance of the first filter 105 is adjusted to move the low-frequency-side region toward 50Ω as indicated by numeral 137. In this manner, adjusting the region of the frequency side toward 50Ω allows the low-frequency-side region of the first filter shown in FIG. 11 to be adjusted to be closer to 50Ω. Thus, the influence of load fluctuation can be suppressed even in the low-frequency-side region in which the isolation effect of the isolator is difficult to be obtained. It should be noted that even when a configuration without matching circuits is used as shown in FIG. 9, impedance adjustment can be carried out on the design phase, based on the same idea, in manufacture of parts.

As described above, impedance adjustment can be carried out by, for example, a manufacturer of mobile communication terminals, based on the aforementioned design concept, in a state in which parts that have been manufactured are mounted on a substrate. In addition, the influence of load fluctuation can be suppressed by adjusting the impedance at a frequency band, for which the isolation effect of the isolator is difficult to be obtained, to be closer to 50Ω.

Figure 13:
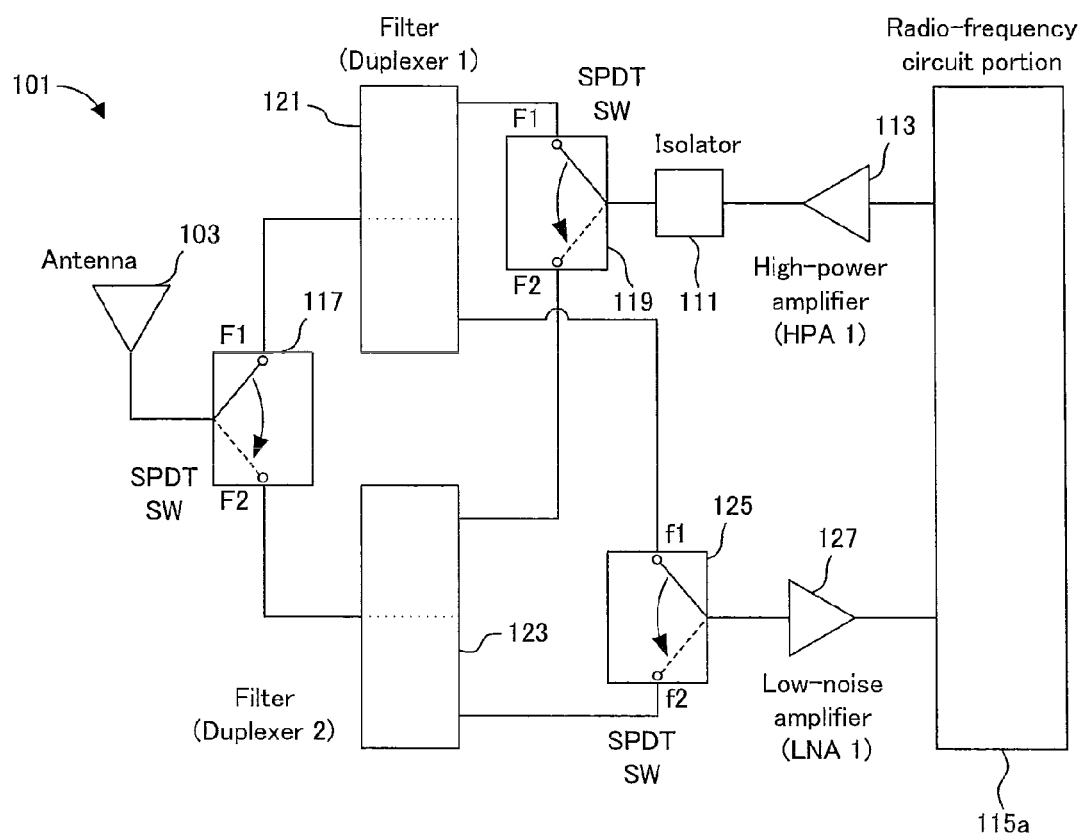
FIG. 13 is a functional block diagram showing an exemplary configuration of a mobile communication terminal device in accordance with the second variation of FIG. 9.

FIG. 13 is a functional block diagram showing a variation of the mobile communication terminal device in accordance with the present embodiment. It includes duplexers 221 and 223 as with FIG. 8. On the transmission side, an isolator 111 and a high-power amplifier 113 are used, and the first filter 221 and the second filter 223 are switched using a switch 117 on the antenna 103 side and a switch 119 on the isolator 111 side. The duplexers 221 and 223 are also used for reception purposes. On the reception side, a low-noise amplifier 227 is used, and the first filter 221 and the second filter 223 are switched using the switch 117 on the antenna 103 side and the switch 119 on the isolator 111 side. Both the transmission side and the reception side are connected to a radio-frequency circuit portion 115*a*, and are controlled by a CPU (not shown) as in the aforementioned embodiment. As described above, the circuit shown in FIG. 13 with the isolator 111 provided on the transmission side also requires the use of only a single high-power amplifier 113 on the transmission side. Thus, the circuit can be simplified and cost can be reduced.

Figure 14:
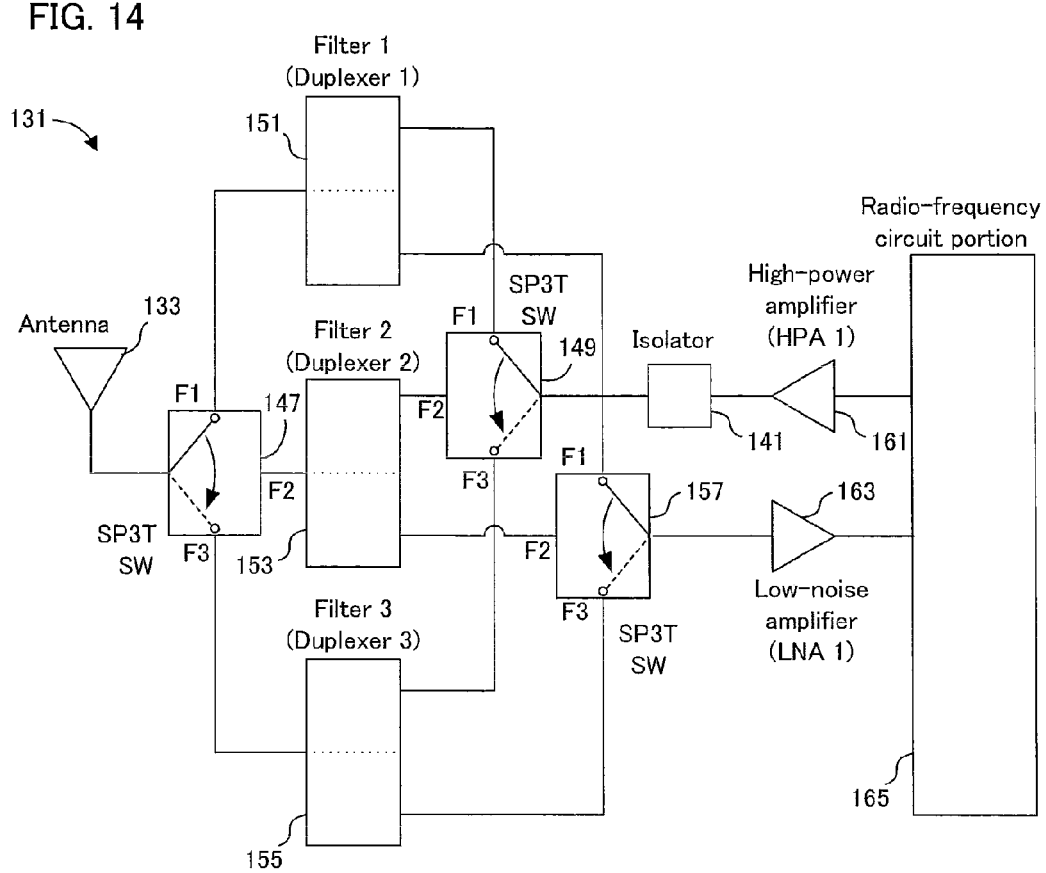
FIG. 14 is a functional block diagram showing an exemplary configuration of a mobile communication terminal device in accordance with the third embodiment of the present invention.
Figure 15:
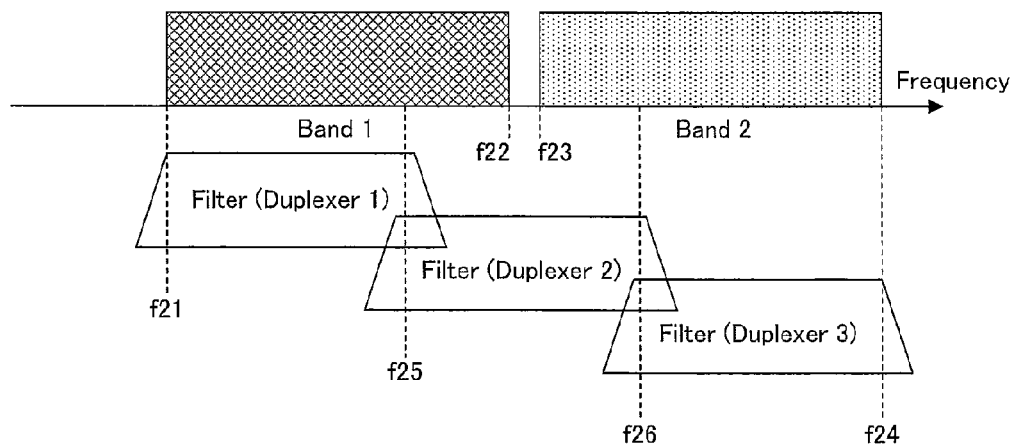
FIG. 15 is a diagram showing an example of setting filters in the circuit configuration shown in FIG. 14.

Next, a mobile communication terminal device in accordance with the third embodiment of the present invention will be described. FIG. 14 is a functional block diagram showing an exemplary configuration of a mobile communication terminal device in accordance with the present embodiment. FIG. 15 exemplarily shows the relationship between the frequency bands used by the communication circuit and the pass bands of the filters in accordance with the present embodiment. As shown in FIG. 14, a mobile communication terminal device 131 in accordance with the present embodiment includes an antenna 133, a first filter 151 (duplexer), a second filter (duplexer) 153, and a third filter (duplexer) 155. In this example, an isolator 141 and a high-power amplifier 161 are also provided on the transmission side, and a low-noise amplifier 163 is provided on the reception side. In addition, both the transmission side and the reception side are controlled by a radio-frequency circuit portion 165 and a CPU (not shown).

On the transmission side, switches 147 and 149 select one of the first to third filters 151, 153, and 155, whereas on the reception side, the switches 147 and 157 select one of the first to third filters 151, 153, and 155.

As shown in FIG. 15, two frequency bands that are a first frequency band (band 1) and a second frequency band (band 2) are used as transmission bands. In the filter design of the first embodiment, the first filter is adapted to cover f1 to f5 of the band f1 to f2 of the band 1 (f2>f5). In contrast, in the filter design of the present embodiment, f21 to f25 of the band 121 to f22 of the band 1 is set as the pass region of the first filter (f25>f26), a region of f22 to f25 is covered by the second filter (the pass region: f25 to f26), and the second frequency region (band 2) is covered by the second filter and the third filter.

Although description has been made with reference to FIG. 15 of an example in which the frequency bandwidths of the band 1 and the band 2 are about equal, it is also possible to cover, in the case in which the band 1 has a wider bandwidth as shown in FIG. 5, the bandwidth of the band 1 with the filter 1 and the filter 2 and cover the bandwidth of the band 2 with the filter 3. Other variations are also possible.

In addition, although FIG. 14 shows an example in which the transmission side and the reception side are combined using duplexers, it is also possible to use typical filters and use a filter configuration similar to that described above for the transmission side or the reception side. Further, although FIG. 15 shows an example in which thee filters including the first to third filters are used, it is needless to mention that four or more filters can be used.

The circuit in accordance with each of the aforementioned embodiments can be used for mobile radio communication terminal devices such as mobile phones or PnAs. Hereinafter, an example of the application of the circuit to a mobile phone will be described as one of the application examples with reference to the drawings.

Figure 16:
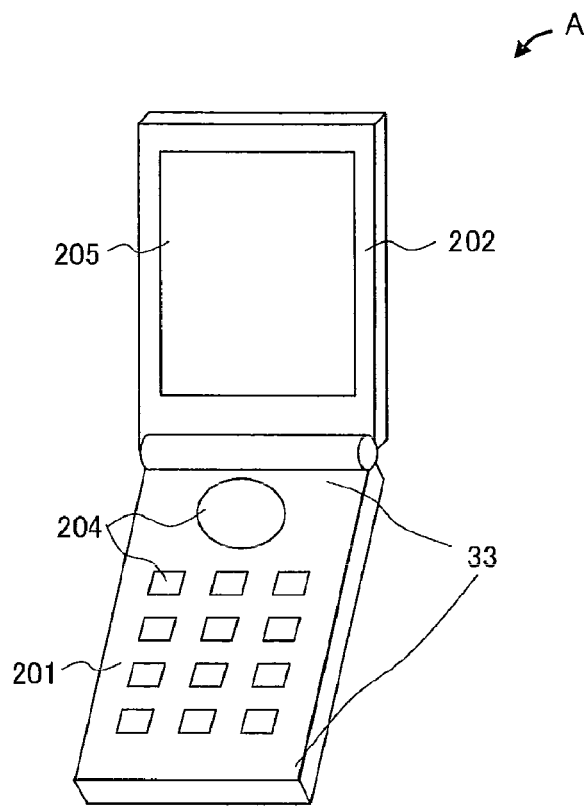
FIG. 16 shows an example of the external view of a mobile phone that can apply the communication technique in accordance with the present embodiment.
Figure 17:
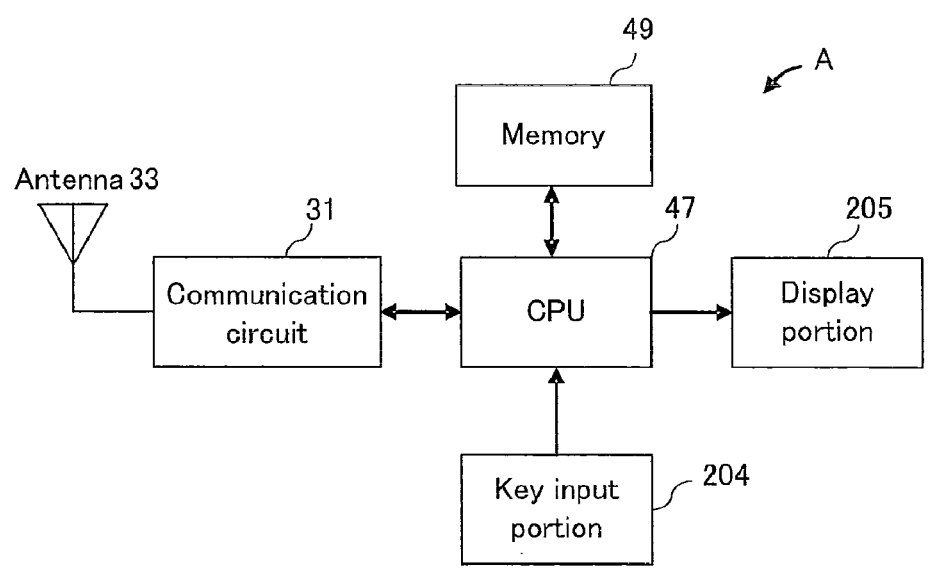
FIG. 17 is a functional block diagram showing an exemplary internal configuration of the mobile phone shown in FIG. 16.
Figure 18:
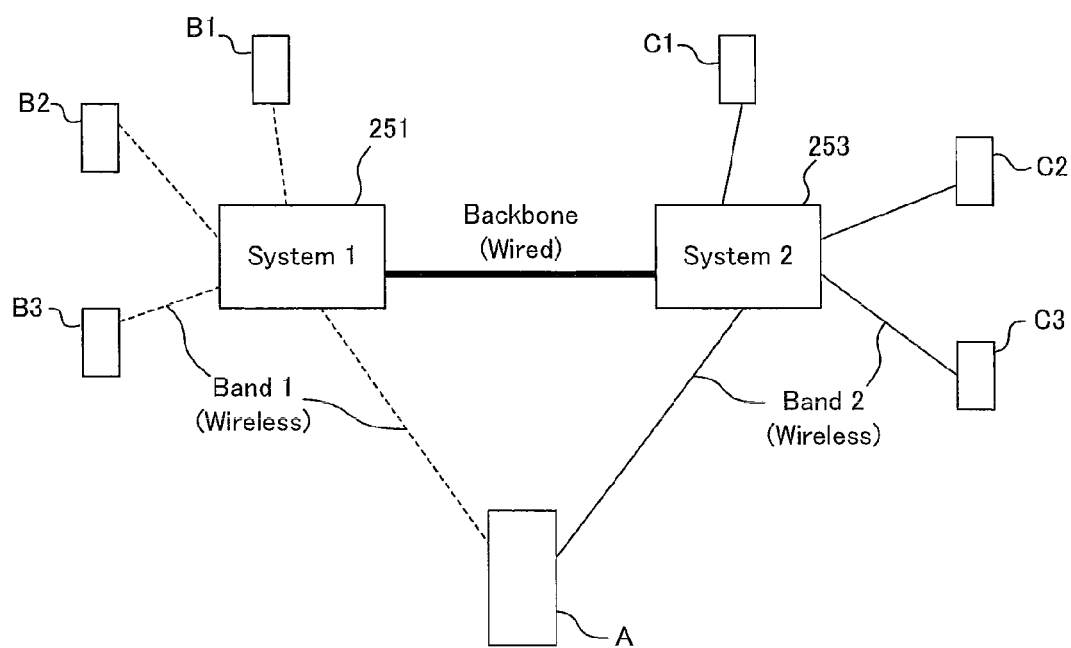
FIG. 18 shows an exemplary schematic configuration of an international roaming communication system that uses the mobile phone shown in FIGS. 16 and 17.

FIG. 16 shows an example of the external view of a multi-band-compatible mobile phone that applies the radio communication technique in accordance with the present embodiment. FIG. 17 is a functional block diagram showing an example of the main configuration of the multiband-compatible mobile phone shown in FIG. 16. FIG. 18 schematically shows a view in which a multiband-compatible mobile phone A is operated on a plurality of communication systems. There are terminals B1 to B3 that operate only within a system 1, terminals C1 to C3 that operate only within a system 2, and the terminal A of the present invention that operate both within the systems 1 and 2. When international roaming is considered, for example, the system 1 can be considered as a domestic system and the system 2 can be considered as an overseas system. Alternatively, other than the international roaming, the system 1 can also be considered as the old band and the system 2 can also be considered as the new band. In that case, A is required as a substitute in the transition phase in which the system 1 is taken over by the second system 2.

The mobile phone A exemplarily shown in FIG. 16 uses the aforementioned communication technique. As shown in FIG. 16, it includes a first chassis 201 and a second chassis 202. The first chassis 201 is provided with an operating portion 204 and the second housing 202 is provided with an LCD display portion 205. As exemplarily shown, the antenna 33 is often built into a portion in the vicinity of the opening/closing hinge between the first chassis and the second chassis or a portion close to the mouth of a user. Accordingly, the impedance of the antenna can easily fluctuate by the influence of the hand or face of the user depending on the method of holding the mobile phone by the user. As shown in the functional block diagram of FIG. 17, the mobile phone A includes an antenna 33, a communication circuit 31 (see FIG. 4 and the like), a CPU 47, memory 49, an operating portion (key input portion) 204, and a display portion 205. With the inclusion of the communication circuit 31 or 101 shown in FIG. 4, 8, 9, 10, 13, 14, or the like, the mobile phone A can communicate with the first system 251 over the first frequency band (1). Further, the mobile phone A can also communicate with the second system 253 over the second frequency band (2). Using the communication technique in accordance with the present embodiment for such a multiband-compatible radio communication device is advantageous in that the influence of load fluctuation can be suppressed.

As described above, the multiband-compatible mobile communication terminal device in accordance with each embodiment of the present invention can suppress the influence of load fluctuation of the power amplifier PA while being operative over multiple bands. It is also possible to use a configuration without an isolator. In that case, reductions in cost and size of the device are possible. Even when an isolator is provided, a configuration with a single power amplifier is possible. In that case, a reduction in cost is also possible.

In systems whose transmission and reception frequencies differ, the transmission frequency and the reception frequency are set in pairs. Thus, once the transmission pass-band width of a duplexer is determined, the reception pass-band width thereof is necessarily determined. The "pass-band width" as used in this specification refers to a transmission bandwidth or a reception bandwidth that is actually used for communication, and includes a bandwidth that is physically wider than such a bandwidth. That is, since discussed here is the impedance at frequencies used for communication, impedance at frequencies outside the used frequencies is not a concern. The same is also true for the circuits on the reception side. When a wide band is used, frequency deviation such as gain or noise figure could increase or could change non-uniformly, which could increase the number of items to be adjusted within the terminal and thus could make the control complex. However, using the filter configuration of the present invention is advantageous in that the design and adjustment of the receiving filter can be simplified by narrowing the band of the receiving filter. Further, narrowing the band of the filter is advantageous in that interference of transmitted waves with the reception circuit can easily be suppressed.

INDUSTRIAL APPLICABILITY

The present invention can be applied to a multiband-compatible mobile phone capable of using different frequency bands.

The invention claimed is:

1. A multiband-compatible radio communication device capable of using a first frequency band and a second frequency band, the device comprising:
    a radio-frequency circuit portion;
    a first power amplifier and a second power amplifier each connected to the radio-frequency circuit portion;
    a first filter connected to the first power amplifier;
    a second filter connected to the second power amplifier;
    an antenna; and
    a switch configured to selectively connect the first filter or the second filter to the antenna, wherein
    a second pass band, which is a pass band of the second filter, includes a part of the first frequency band and the entire second frequency band, and
    a first pass band, which is a pass band of the first filter, includes the rest of the first frequency band.

2. The multiband-compatible radio communication device according to claim 1, wherein the second filter processes the second frequency band and the first frequency band.

3. The multiband-compatible radio communication device according to claim 1, wherein the first frequency band is processed by the first filter and the second filter.

4. The multiband-compatible radio communication device according to claim 1, wherein the first power amplifier and the second power amplifier are identical power amplifiers.

5. The multiband radio communication device according to claim 1, wherein the first pass band and the second pass band are used by different systems.

6. A multiband-compatible radio communication device capable of using a plurality of frequency bands including a first frequency band and a second frequency band different from the first frequency band, the device comprising:
    a radio frequency circuit portion;
    a first power amplifier, a second power amplifier, and a third power amplifier each connected to the radio frequency circuit portion;
    a first filter connected to the first power amplifier;
    a second filter connected to the second power amplifier;
    a third filter connected to the third power amplifier;
    an antenna; and
    a switch configured to selectively connect one of the first filter to the third filter to the antenna, wherein
    a first pass band, which is a pass band of the first filter, includes a part of the first frequency band,
    a second pass band, which is a pass band of the second filter, includes another part of the first frequency band and a part of the second frequency band,
    a third pass band, which is a pass band of the third filter, includes another part of the second frequency band, and
    the first frequency band and the second frequency band are entirely covered by the first pass band, the second pass band, and the third pass band.

7. The multiband radio communication device according to claim 6, wherein each of bandwidths of the first pass band, the second pass band, and the third pass band is narrower than each of bandwidths of the first frequency band and the second frequency band.

8. The multiband-compatible radio communication device according to claim 6, wherein two or more of the first power amplifier, the second power amplifier, and the third amplifier are identical power amplifiers.

9. The multiband radio communication device according to any one of claims 1 to 8, wherein the first pass band and the second pass band are all transmission bands or all reception bands.

10. The multiband-compatible radio communication device according to claim 4 or 8, wherein the second power amplifier is identical to the first power amplifier, and the device further comprises:
  an isolator provided between the first power amplifier and the first and second filters, the isolator being configured to isolate an impedance fluctuation of an output of the first power amplifier; and
  a first switch configured to selectively output an output of the isolator to the first filter or the second filter.

11. The multiband-compatible radio communication device according to claim 10, wherein a frequency at which a maximum isolation effect of the isolator is obtained is set close to a boundary between the first pass band and the second pass band or overlapping frequencies thereof.

12. The multiband-compatible radio communication device according to claim 10, wherein
  an output impedance of the first filter, on a frequency side farther from the pass band of the second filter than a frequency side closer to the pass band of the second filter, is relatively close to 50Ω, and
  an output impedance of the second filter, on a side of its pass band further from the pass band of the first filter than a side closer to the pass band of the first filter, is also relatively close to 50Ω.

13. The multiband-compatible radio communication device according to claim 10, wherein
  an input impedance of the first filter, on a frequency side of its pass band further from the pass band of the second filter than a side closer to the pass band of the second filter, is relatively close to 50Ω, and
  an input impedance of the second filter, on a side of its pass band further from the pass band of the first filter than a side closer to the pass band of the first filter, is also relatively close to 50Ω.

14. The multiband-compatible radio communication device according to claim 10, further comprising a matching circuit provided for at least one of the first filter and the second filter, the matching circuit being configured to adjust the impedance of the filter.

* * * * *